United States Patent
Nagesh et al.

(10) Patent No.: US 7,515,543 B2
(45) Date of Patent: *Apr. 7, 2009

(54) PACKET REORDER RESOLUTION IN A LOAD-BALANCED NETWORK ARCHITECTURE

(75) Inventors: Harsha S. Nagesh, Berkeley Heights, NJ (US); Viswanath Poosala, Middlesex, NJ (US); Sudipta Sengupta, Malden, MA (US); Peter J. Winzer, Tinton Falls, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 644 days.

This patent is subject to a terminal disclaimer.

(21) Appl. No.: 11/018,282

(22) Filed: Dec. 21, 2004

(65) Prior Publication Data

US 2006/0133430 A1    Jun. 22, 2006

(51) Int. Cl.
*H04J 1/16* (2006.01)
(52) U.S. Cl. .................................. 370/238
(58) Field of Classification Search .......... 370/230.1, 370/360, 392, 401, 412, 413, 400, 237, 238, 370/536, 395.4, 503, 235
See application file for complete search history.

(56) References Cited

U.S. PATENT DOCUMENTS 6,628,649 B1 *  9/2003  Raj et al. ................. 370/360
6,839,322 B1 *  1/2005  Ashwood Smith ........... 370/235
7,227,843 B2 *  6/2007  Belanger et al. ............ 370/237
2001/0009547 A1 *  7/2001  Jinzaki et al. ............... 370/390

OTHER PUBLICATIONS

U.S. Appl. No. 10/785,352, filed Feb. 24, 2004, Nagesh et al.
S. Keshav et al., "Issues and Trends in Router Design," IEEE Communication Magazine, 15 pages, 1998.
C-S. Chang et al., "Loud Balanced Birkhoff-von Neumann Switches, Part I: One-stage Buffering," Computer Communications, pp. 1-25, 2001.
L.G. Valiant, "A Scheme for Fast Parallel Communication," SIAM Journal of Computing, vol. 11, No. 2, pp. 350-361, 1982.
ITU-T Recommendation G.7042/Y.1305-Corrigendum 1, "Link Capacity Adjustment Scheme(LCAS) for Virtual Concatenated Signals," 16 pages, 2002.
ITU-T Recommendation G.7042/Y.1305, "Link Capacity Adjustment Scheme (LCAS) for Virtual Concatenated Signals," 24 pages, 2001.
ITU-T Recommendation G.707/Y.1322, "Network Node Interface for the Synchronous Digital Hierarchy," 184 pages, 2000.

(Continued)

*Primary Examiner*—Chi H Pham
*Assistant Examiner*—Alexander Boakye

(57) ABSTRACT

A load-balanced network architecture is disclosed in which a traffic flow deliverable from a source node to a destination node via intermediate nodes is split into parts, and the parts are distributed to respective ones of the intermediate nodes. Path delay differences for the parts are substantially equalized by delay adjustment at one or more of the intermediate nodes, and packets of one or more of the parts are scheduled for routing from respective ones of the intermediate nodes to the destination node based on arrival times of the packets at the source node.

19 Claims, 5 Drawing Sheets

OTHER PUBLICATIONS

I. Keslassy et al., "Maintaining Packet Order in Two-Stage Switches," Proceedings of IEEE Infocom, 10 pages, New York, 2002.

E. Blanton et al., "On Making TCP More Robust to Packet Reordering," pp. 1-11, Jul. 24, 2001.

S. Iyer et al., "Making Parallel Packet Switches Practical," Proceedings of IEEE Infocom, 8 pages, 2001.

C-S. Chang et al., "Load Balanced Birkhoff-Von Neumann Switches, Part II: Multi-Stage Buffering," pp. 1-23, Aug. 29, 2001.

* cited by examiner

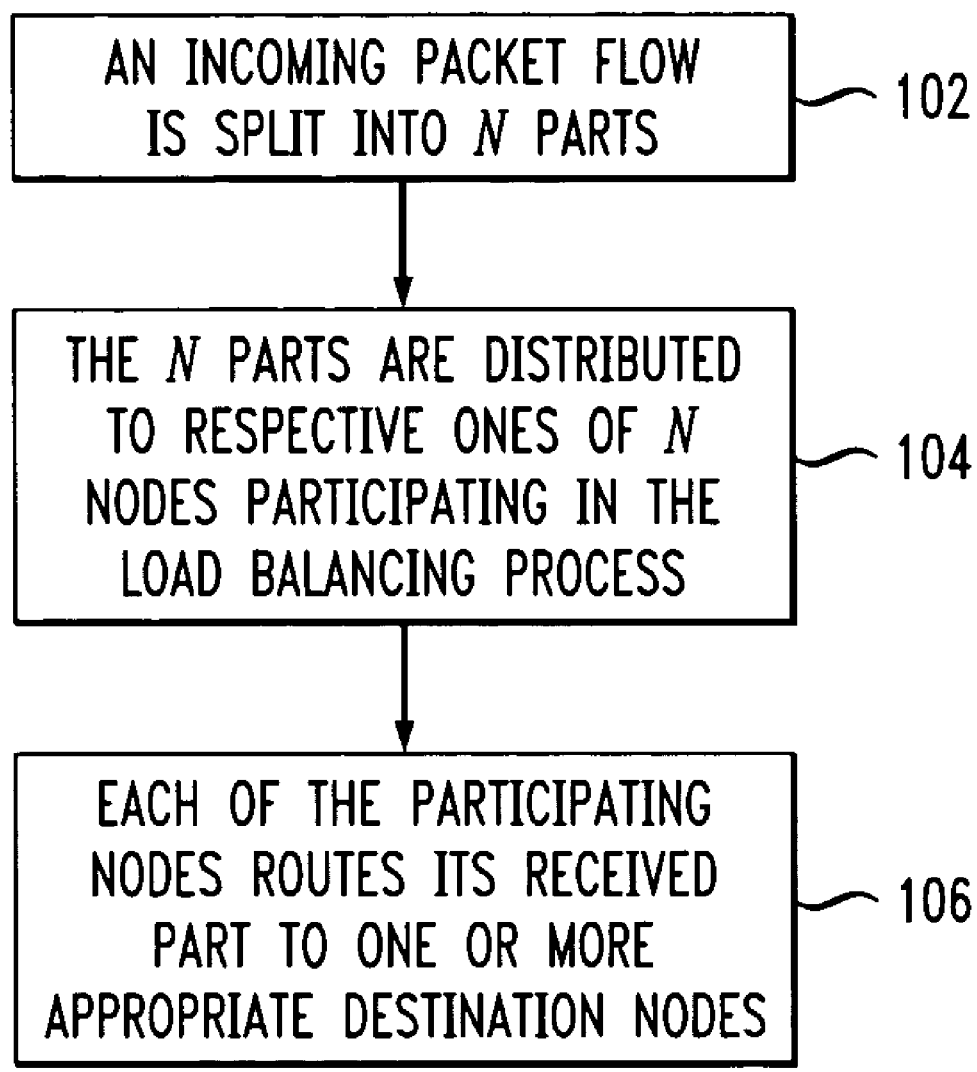

PACKET REORDER RESOLUTION IN A LOAD-BALANCED NETWORK ARCHITECTURE

RELATED APPLICATION

The subject matter of the present application is related to that of U.S. patent application Ser. No. 10/785,352, filed Feb. 24, 2004 in the name of inventors Harsha S. Nagesh et al. and entitled "Load Balancing Method and Apparatus for Ethernet Over SONET and Other Types of Networks," which is incorporated by reference herein.

FIELD OF THE INVENTION

The present invention relates generally to the field of data communication networks, and more particularly to load balancing techniques for use in such networks.

BACKGROUND OF THE INVENTION

Circuit-switched network architectures, such as those based on synchronous optical network (SONET) or synchronous digital hierarchy (SDH) standards, were originally designed to support voice traffic using dedicated fixed-bandwidth connections. Although such networks are advantageous in that they incorporate substantial reliability and protection mechanisms, their primary disadvantage has been a lack of bandwidth efficiency.

Packet-switched network architectures, which include those based on asynchronous transfer mode (ATM) or Internet protocol (IP) standards, have traditionally been much better able than circuit-switched architectures to handle data traffic. Since data traffic is inherently bursty, it leads to underutilization of the fixed-bandwidth connections of conventional circuit-switched networks. Packet-switched network architectures provide the benefits of statistical multiplexing, which allows for better handling of bursty data traffic.

Recently, virtual concatenation (VC) and link capacity adjustment scheme (LCAS) protocols have been developed which allow more efficient use of the existing fixed-bandwidth connections associated with circuit-switched SONET/SDH network infrastructure. For example, these protocols are utilized in transmission of Ethernet over SONET (EoS) data traffic over metropolitan networks, and in numerous other data transmission applications. The VC and LCAS protocols are described in greater detail in, for example, ITU-T standards documents G.707 and G.7042, respectively, both of which are incorporated by reference herein.

Virtual concatenation generally allows a given source node of a network to form a virtually-concatenated group (VCG) which includes multiple members each associated with a corresponding data stream. The different data streams may then be transmitted over diverse routes through the network from the source node to a given destination node. The destination node recombines the streams to reconstruct the original VCG.

The LCAS protocol enhances the basic virtual concatenation functionality described above by allowing so-called "hit-less" addition and deletion of members from a VCG, that is, addition and deletion of members without the introduction of errors into the transmitted data. The LCAS protocol also enables a VCG to operate at a reduced capacity after the failure of routes associated with one or more members, by allowing the temporary removal of members associated with failed routes from the VCG.

Despite the improvements associated with the recently-developed VC and LCAS protocols, there remain problems in both circuit-switched and packet-switched network architectures. Generally, existing architectures can be difficult to scale so as to accommodate large mesh topologies, and can still suffer from bandwidth efficiency or switching complexity concerns. For example, an architecture comprising an IP overlay over SONET may require an excessive amount of link bandwidth, while a pure IP network architecture will typically require a large amount of packet switching capacity at each network node.

The above-cited U.S. patent application Ser. No. 10/785,352 discloses an improved network architecture that can provide bandwidth efficiency without requiring high packet switching capacities at each node. In an illustrative embodiment of this load-balanced network architecture, there are N participating network nodes. An incoming packet flow of rate R at a given one of the nodes is split into N substantially equal parts, each having a rate of R/N. The packet flow is split into the N parts in a manner independent of the particular destination node or nodes that may be associated with that flow. The N parts of the incoming packet flow are distributed to respective ones of the N participating nodes, such that each of the N participating nodes receives a corresponding one of the N parts. Pre-provisioned circuits, each configured to support a rate of R/N, are used to distribute the parts to the various participating nodes. At least a subset of the participating nodes then route their respective parts to the one or more specified destination nodes. This illustrative embodiment thus routes individual parts of the given traffic flow over respective two-hop paths from a source node to a destination node via intermediate nodes. By avoiding the need for high packet switching capacities at each node, this load-balanced architecture facilitates the implementation of large-scale networks for EoS data traffic or other types of traffic flows.

An important issue that may arise in the context of load-balanced architectures such as that described in the above-cited U.S. patent application Ser. No. 10/785,352 relates to packet reordering. More specifically, by separating a given traffic flow into multiple parts, and routing the various parts to one or more destination nodes over different paths, the parts may arrive in an order other than that in which they were sent. This out-of-order packet arrival is attributable primarily to factors such as unequal delays in the various paths, and differences in the queuing of packets at participating nodes. Another factor which can influence this issue is the scheduling algorithm used at the intermediate node to schedule packets for transmission to a destination node.

A number of techniques are known in the art for dealing with the packet reordering issue in a two-stage network switch. However, these techniques exhibit a number of drawbacks, particularly in the load-balanced network architecture context described above. For example, an approach proposed in C. S. Chang et al., "Load balanced Birkhoff-Von Neumann Switches, Part II: Multi-Stage Buffering," Computer Communications, Vol 25, pp. 611-622, 2002, involves scheduling of packets based on their expected departure times in an equivalent output queued IP router. However, this approach fails to account for path delay variations, and is thus not readily applicable to a geographically-distributed network. Another approach, described in I. Keslassy et al, "Maintaining Packet Order in Two-Stage Switches," Proceedings of IEEE Infocom, New York, 2002, requires out-of-band communication that can result in a bottleneck.

It is therefore apparent that improved techniques are needed for dealing with the issue of packet reordering in load-balanced network architectures.

SUMMARY OF THE INVENTION

The present invention meets the above-noted need by providing techniques which substantially eliminate or otherwise limit the amount of packet reordering that is required in a given load-balanced network architecture.

In accordance with an aspect of the invention, a load-balanced network architecture is disclosed in which a traffic flow deliverable from a source node to a destination node via intermediate nodes is split into parts, and the parts are distributed to respective ones of the intermediate nodes. Path delay differences for the parts are substantially equalized by delay adjustment at one or more of the intermediate nodes, and packets of one or more of the parts are scheduled for routing from respective ones of the intermediate nodes to the destination node based on arrival times of the packets at the source node.

In an illustrative embodiment, each of the parts follows one of N different paths from the source node to the destination node via a corresponding one of the intermediate nodes. More specifically, a traffic flow denoted $f_{i,k}$, where i is the source node of the flow and k is the destination node of the flow, may be load balanced substantially equally onto N intermediate nodes. In this embodiment, the path delay differences for the parts are substantially equalized by adjusting the delay of at least one of the parts at a corresponding one of the intermediate nodes, and scheduling the packets for routing from that intermediate node to the destination node using an earliest-deadline-first scheduling algorithm.

In accordance with another aspect of the invention, a given one of the intermediate nodes comprises a plurality of output queues, each associated with a corresponding one of N possible destination nodes in a load-balanced network. More specifically, a given one of the output queues comprises a queue bank logically partitioned into N−1 queues, one per source-destination flow $f_{i,k}$, where i≠k and i,k ∈ {1, . . . N}. The given intermediate node may therefore comprise a total of N(N−1) logically separate queues in its plurality of output queues.

In accordance with a further aspect of the invention, path delay differences for the parts may be substantially equalized by determining delays of N different paths used for respective parts of a traffic flow $f_{i,k}$ between a source node i and a destination node k; sorting the path delays in increasing order, the sorted path delays being p1 to pN, where path delay pj stands for the path delay from source node i to destination node k passing through intermediate node j; and adding a delay given approximately by (pN−pj) to path delay pj at the intermediate node j. The added delay may be introduced by providing an additional buffer delay equal to (pN−pj) in a particular queue that buffers packets of flow $f_{i,k}$ at the intermediate node j.

Advantageously, the network architecture in the illustrative embodiment overcomes the problems associated with the above-described conventional approaches to dealing with the packet reorder issue in a load-balanced network architecture.

BRIEF DESCRIPTION OF THE DRAWINGS

FIG. 1 is a flow diagram of a load balancing process in an illustrative embodiment of the invention.

DETAILED DESCRIPTION OF THE INVENTION

Figure 2A:
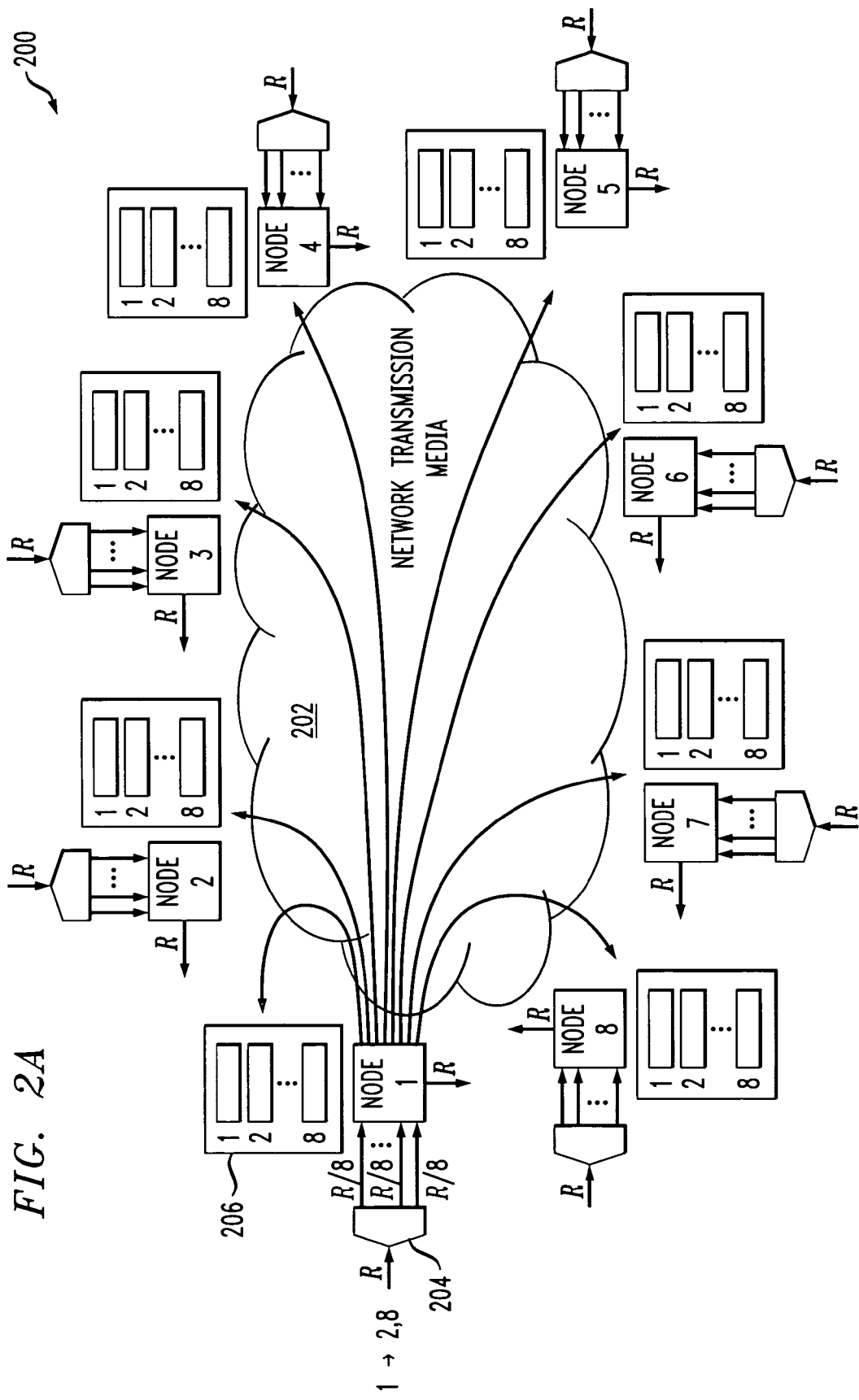
FIGS. 2A and 2B show views of an example network architecture implementing a load processing process of the type described in conjunction with FIG. 1.

The invention will be illustrated herein in conjunction with an illustrative embodiment which utilizes a load-balanced network architecture of the type described in the above-cited U.S. patent Ser. No. 10/785,352. It is to be appreciated, however, that the invention is not limited to the particular network architecture and associated load balancing process of the illustrative embodiment, but is more generally applicable to any network application in which it is desired to provide improved packet reordering.

For example, although well suited for use with EoS data traffic, with or without virtual concatenation, the invention can be used with any type of traffic flow.

Referring now to the flow diagram of FIG. 1, a load balancing process in an illustrative embodiment of the invention will be described. The process in this example includes steps 102, 104 and 106. It will be assumed for purposes of simplicity and clarity of illustration that the network comprises N nodes, each of which needs to support an ingress and egress traffic rate of R. The variable N is an arbitrary number that can take on any desired value consistent with the practical constraints of a given implementation.

In step 102, an incoming packet flow of rate R at a given network node is split into a plurality of parts, more specifically denoted as N parts. The incoming packet flow of rate R is split into its N parts in a manner that is independent of the particular destination node or nodes that may be associated with that packet flow.

In step 104, the N parts of the incoming packet flow are distributed to respective ones of N nodes participating in the load balancing process. Thus, each of the N participating nodes in this example receives a corresponding one of the N parts. The distribution of the parts to the various participating nodes, other than the given node at which the flow splitting occurs, preferably takes place over pre-provisioned circuits each configured to support a rate of R/N. Each of the pre-provisioned circuits is thus able to transport one of the N parts of the split packet flow.

The participating nodes to which parts of a split packet flow are distributed are also referred to herein as "intermediate" nodes. Certain of these intermediate nodes may also correspond to destination nodes, which may be final destination nodes. Also, a given node may be a source or destination node for one flow, and an intermediate node for one or more other flows.

In step 106, each of the participating nodes routes its received part to one or more appropriate destination nodes.

The splitting of a given flow may be a substantially equal split, which involves splitting the flow into a plurality of equal or substantially equal parts, as in the above-noted situation in which each of N parts of a rate-R flow has a rate of R/N, or may be a non-equal split, which involves splitting the flow into a number of non-equal parts. Various combinations of equal and non-equal flow splitting may be used, and different nodes in the network may utilize different types of flow splitting.

In addition, the flow splitting may be performed at a packet level, independent of the final destination node of the packet, so as to facilitate the handling of variable-length packets. Other types of flow splitting may be used.

A more particular example of the load balancing process of FIG. 1 will now be described in conjunction with the network architecture shown in FIGS. 2A and 2B.

Referring initially to FIG. 2A, an example network 200 is shown. The network 200 comprises eight nodes, generally denoted 1, 2, . . . 8, which are configured to communicate over network transmission media 202. Each of the nodes is assumed to support an ingress and egress traffic rate of R, as in the previous example. Associated with each of the nodes is at least one corresponding flow splitter 204 and a corresponding set of virtual output queues (VOQs) 206. A given one of the sets of VOQs includes a separate queue for each of the eight nodes. Although the flow splitters 204 and VOQ sets 206 are shown as being separate from their corresponding nodes 1, 2, . . . 8, this is for purposes of simplicity and clarity of illustration, and each node 1, 2, . . . 8 may be implemented so as to incorporate therein its associated flow splitter 204 and VOQ set 206. A node of this type will be described in greater detail below in conjunction with FIG. 3. Numerous other node implementations are possible.

The output queues of the illustrative embodiment are referred to as "virtual" in order to emphasize that physically separate queues are not required, and that other techniques may be used to associate particular portions of a memory space with different destination nodes. However, the invention can be implemented using non-virtual queuing arrangements, in which physically separate queues are provided for different destination nodes. The term "queue" as used herein should be construed generally, so as to encompass either a virtual or non-virtual queue, or combinations of multiple such queues.

In operation, an incoming packet flow arrives at node 1, to be routed to destination nodes 2 and 8. The incoming rate-R packet flow at node 1 is split via the associated flow splitter into eight substantially equal-rate parts of rate R/8.

The flow splitting may be achieved, by way of example, by maintaining N queues at each of the nodes and filling the queues utilizing a round-robin technique, shortest queue first technique or other type of queue-filling technique. Such queues and corresponding control logic may be implemented in a node memory or as a separate device coupled to or otherwise associated with a given node. It is also possible to utilize the above-noted VC and LCAS protocols, or other virtual concatenation techniques or straightforward modifications thereof, to implement the desired flow splitting. It should be noted that use of certain conventional virtual concatenation techniques would provide flow splitting at a byte level, and thus may not be directly utilizable in the illustrative embodiment without suitable modification to ensure that the desired packet format is maintained after splitting of the flow.

Subsequent to the flow split, the various parts of the flow are distributed to respective ones of the participating nodes. In this example, the eight parts, each of rate R/8, are distributed to respective ones of the eight nodes, as shown in FIG. 2A. Thus, one of the parts remains at node 1, although it may be viewed as being "distributed" to that node, as this term is intended to be construed generally herein. The distribution of the various parts to nodes 2 through 8 is preferably implemented using pre-provisioned circuits of rate R/8, although other types of distribution may be used. The pre-provisioning of circuits for distributing the various parts of a split flow may be implemented using conventional techniques of a type well known to those skilled in the art, and advantageously avoids the need for real-time circuit setup responsive to changing traffic patterns.

Once each of the parts has been distributed to its corresponding intermediate node, the parts are routed to the appropriate destination node or nodes. In this example, the destination nodes of the incoming packet flow are nodes 2 and 8.

Figure 2B:
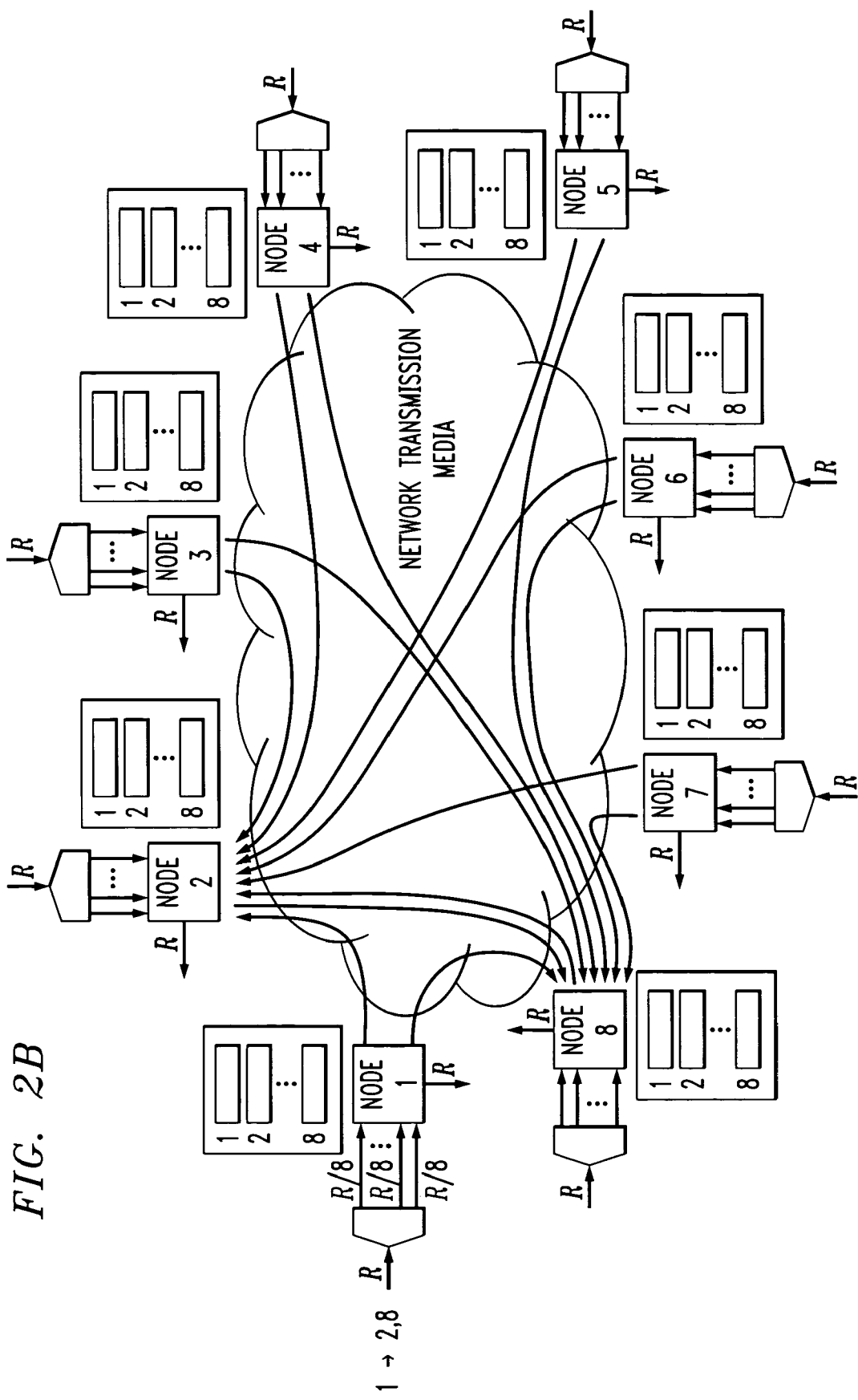

FIG. 2B shows the routing of the packets from the sets of VOQs to the appropriate destination nodes 2 and 8. This routing process, as illustrated in FIG. 2B, generally involves each intermediate node examining destination addresses in packet headers of its received part, and storing the packets in appropriate resequencing buffers or VOQs, based on the destination addresses. As noted above, a given one of the sets of VOQs includes a separate queue for each of the eight nodes in this example. Since the destination nodes of the split flow are nodes 2 and 8, the VOQs corresponding to nodes 2 and 8 will store the packets of the various parts, based on packet header destination address.

It should be noted that those packets distributed to node 2 that have a final destination of node 2 are not enqueued in the corresponding VOQ, but are instead stored in a resequencing buffer of node 2. Similarly, those packets distributed to node 8 that have a final destination of node 8 are not enqueued in the corresponding VOQ, but are instead stored in a resequencing buffer of node 8.

It is to be appreciated that the particular arrangements of network elements and processing steps shown in FIGS. 1, 2A and 2B are presented by way of illustrative example only, and should not be construed as limiting the scope of the invention in any way. As indicated previously, the invention can be implemented using a wide variety of other network configurations and traffic flow processing operations.

An advantage of the illustrative embodiment over conventional arrangements is that each of N network nodes participating in the load balancing process for a rate-R flow receives a total amount of traffic flow corresponding to N times R/N=R. Thus, the required switching capacity of each node is fixed based on rate, and is not a function of N, which allows the architecture to be readily scaled to accommodate large mesh topologies. By way of contrast, a pure IP architecture for a similar configuration would require a switching capacity on the order of (N−1)R at each of the nodes. Also, bandwidth efficiency is improved relative to the IP overlay over SONET architecture, which requires, for a general ring topology of N nodes with unidirectional routing, an aggregate link bandwidth on the order of $N^2(N-1)R/2$.

The illustrative embodiment thus provides bandwidth efficiency without requiring high packet switching capacities at each node. Other advantages include improved security and reduced sensitivity to node or link failures, since each node receives only a 1/N portion of a given traffic flow. Also, since each packet is queued only once, the end-to-end delay in this architecture is bounded. Operationally, this architecture is well suited for service providers to gradually grow their networks in a phased manner, by including more nodes participating in the load balancing process.

Figure 3:
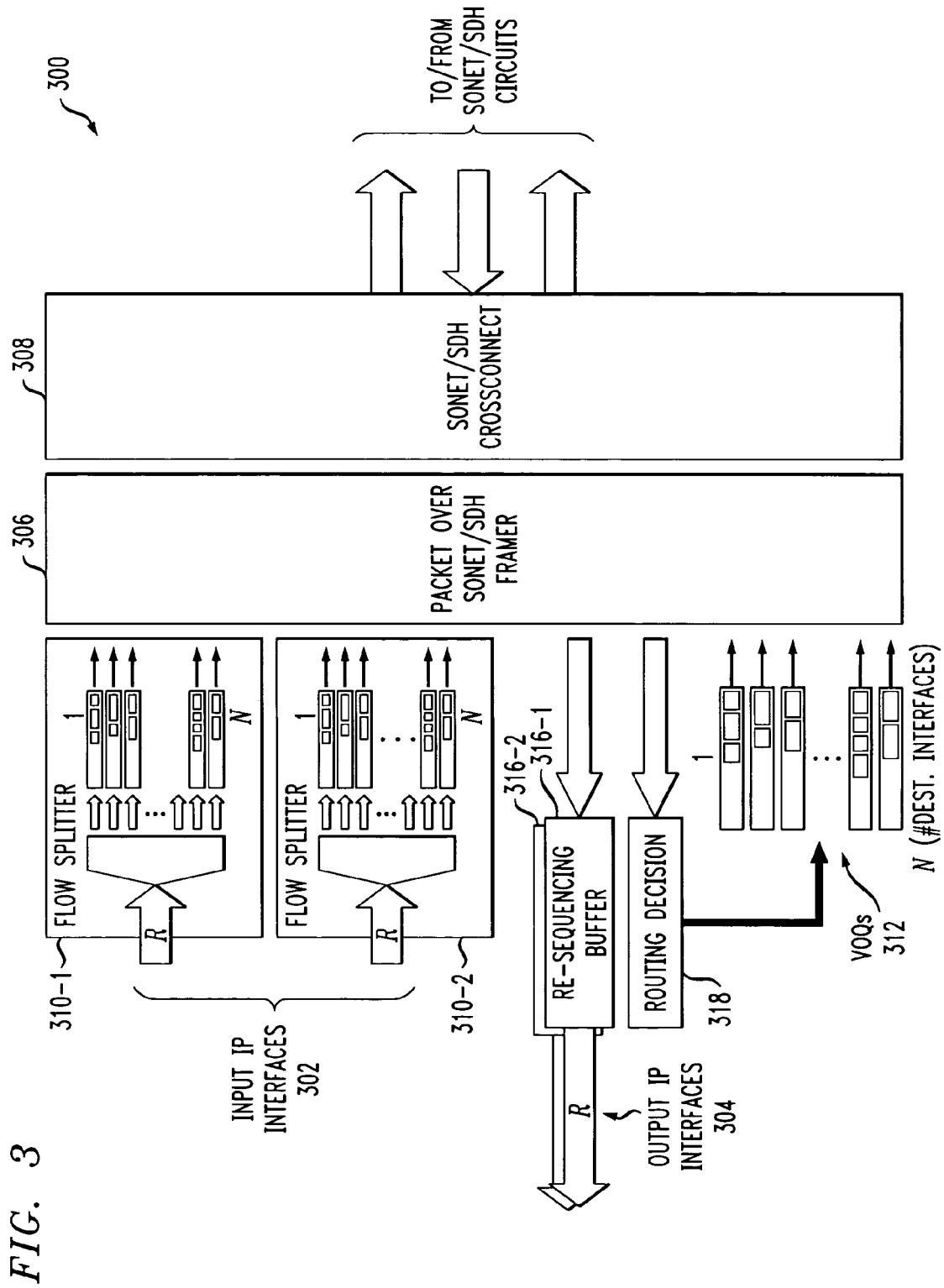
FIG. 3 shows an exemplary implementation of a network node suitable for implementing a load balancing process of the type described in conjunction with FIG. 1.

FIG. 3 shows an exemplary implementation of a particular one of the network nodes in a load-balanced network architecture in accordance with the invention. The node 300 may be viewed as representing, for example, one of the nodes 1, 2, . . . 8 in the network 200 previously described in conjunction with FIGS. 2A and 2B.

The node 300 includes multiple input IP interfaces 302 and multiple output IP interfaces 304, with each of the individual input or output interfaces being of rate R. Each of the input IP interfaces 302 has a flow splitter 310-1 or 310-2 associated therewith, and each of the output IP interfaces has a resequencing buffer 316-1 or 316-2 associated therewith. Although only two input IP interfaces and two output IP interfaces are shown, it should be understood that a given network node configured in accordance with the invention may include more or fewer interfaces, and the number of associated flow splitters or resequencing buffers would be adjusted accordingly.

Also included in the node 300 are a routing decision block 318 and a set of VOQs 312 arranged as shown. The set of VOQs 312 includes N separate queues, as was previously described in conjunction with FIGS. 2A and 2B, although other configurations may alternatively be used.

The node 300 further includes a number of SONET/SDH circuits, including a packet over SONET/SDH framer 306 and a SONET/SDH crossconnect 308, which communicate with one or more additional SONET/SDH circuits not explicitly shown. These and other SONET/SDH circuits utilizable in node 300 may be implemented in a conventional manner, and will not be further described herein. The term "SONET/SDH" as used herein is intended to include SONET only, SDH only, or combinations of SONET and SDH.

At each of the input interfaces 302, a traffic flow of rate R is split into N different parts, in the manner described previously, utilizing flow splitter 310-1 or 310-2. Each of the individual parts is then mapped onto a corresponding pre-provisioned SONET/SDH circuit. Any packets received by the node 300 are first examined to determine whether or not they have reached their final destination. If node 300 is the final destination for a given packet, that packet is placed in the appropriate re-sequencing buffer 316-1 or 316-2 such that packets are permitted to leave the node in the same order in which they entered the network. If node 300 is an intermediate node not corresponding to the final destination for the given packet, the packet is placed in the appropriate queue in the set of VOQs 312. From the VOQ, the packet is routed via the corresponding SONET/SDH circuit to its destination node.

The particular node implementation shown in FIG. 3 is intended as an example of one possible network node that may be used in implementing the load-balanced network architecture in the illustrative embodiment previously described. Other types of node configurations may be used, as will be appreciated by those skilled in the art, and a given network may include many nodes with differing configurations.

Generally, a node may be configured so as to include a processor coupled to a memory. The processor may comprise a microprocessor, a microcontroller, a central processing unit (CPU), an application-specific integrated circuit (ASIC) or other type of processing device, as well as portions or combinations of such devices. The memory may include an electronic random access memory (RAM), a read-only memory (ROM) or other type of storage device, as well as portions or combinations of such devices. The memory may be used to store software that is executed by or otherwise utilized by the processor in implementing at least a portion of a load balancing process in accordance with the invention.

With reference again to the node 300 of FIG. 3, elements such as flow splitters 310, VOQs 312, resequencing buffers 316, and routing decision block 318 may be viewed as one possible implementation of a processor and associated memory. For example, routing decision block 318 may be viewed as an element of a processor coupled to a memory comprising VOQs 312.

The node 300 may be viewed as an example of what is more generally referred to herein as a "processing device." Such a processing device may be implemented in the form of one or more integrated circuits, as well as in the form of other types of hardware, software or firmware, in any combination.

It is to be appreciated that the network 200 and node 300 are considerably simplified for purposes of illustration, and may include other elements, not explicitly shown, that are commonly found in conventional networks or nodes. For example, although the flow splitter element 206 implements the load balancing functionality in the illustrative embodiment, in other embodiments a separate load balancing element may be used.

As mentioned previously, an issue that may arise in the context of load-balanced architectures such as that described in conjunction with FIGS. 1 through 3 above relates to packet reordering. Packets received at a given destination node may be received in an order that is different than their order of arrival at the source node. Such out-of-order packet arrival in a load-balanced architecture of the type described above is primarily a result of variations in path delay and queuing delay for the different parts of the divided packet flow. More particularly, different path delays may be incurred by the N different paths from the source node to the destination node through the N intermediate nodes, and different queuing delays may be incurred at the intermediate nodes based on, e.g., current queue occupancy.

The manner in which the packet reordering issue is addressed in the illustrative embodiment will now be described in detail with reference to FIG. 4.

Consider by way of example a packet flow denoted $f_{i,k}$, where i is the source node of the flow and k is the destination node of the flow. Flow $f_{i,k}$ is load balanced equally onto N intermediate nodes in the manner illustrated in FIGS. 2A and 2B. Each of the N parts contains packets from the original flow $f_{i,k}$, and the order of the packets within the parts is preserved. In accordance with an aspect of the invention, the packets are also time stamped by their order of arrival at the source node, using well-known conventional time stamping techniques. This time stamping allows the intermediate nodes to schedule their respective packets for routing from the VOQs using, for example, an earliest-deadline-first scheduling algorithm, as will be described below. Since all the nodes of a given load-balanced network are synchronized through the underlying SONET/SDH network infrastructure, the time stamps on packets arriving at the intermediate nodes from different source nodes will all be based on the same reference clock.

The packet reordering issue is therefore addressed in the illustrative embodiment by equalizing the different path delays between the source and destination nodes at the intermediate nodes, and then using earliest-deadline-first scheduling, or a similar scheduling algorithm based on the source node arrival time stamps, to schedule the packets for routing from the intermediate nodes. This approach addresses both the path delay and queuing delay variations that result in packet reordering.

In order to equalize the N different path delays from a given source node to a given destination node in the load-balanced architecture, the delay along each of the N paths is determined, for example, as part of the network design, or using other techniques. The paths may then be sorted in increasing order of their delays. Let these path delays in the sorted order be p1 to pN, where path delay pj stands for the path delay from source node i to destination node k passing through intermediate node j.

Each intermediate node maintains a set of N of the VOQs, one per destination node in the network, as previously described in conjunction with FIG. 3. In accordance with an aspect of the invention, each such VOQ comprises a VOQ bank that is logically partitioned into N−1 queues, one per source-destination flow $f_{i,k}$, where i≠k and i,k ∈ {1, ... N}. A given intermediate node therefore contains a total of N(N−1) queues in its set of VOQs 312'.

The path delays of the N paths between source node i and destination node k can then be equalized by, for example, adding an additional buffer delay equal to (pN−pj) to the particular queue that buffers packets of flow $f_{i,k}$ at the intermediate node j.

Figure 4:
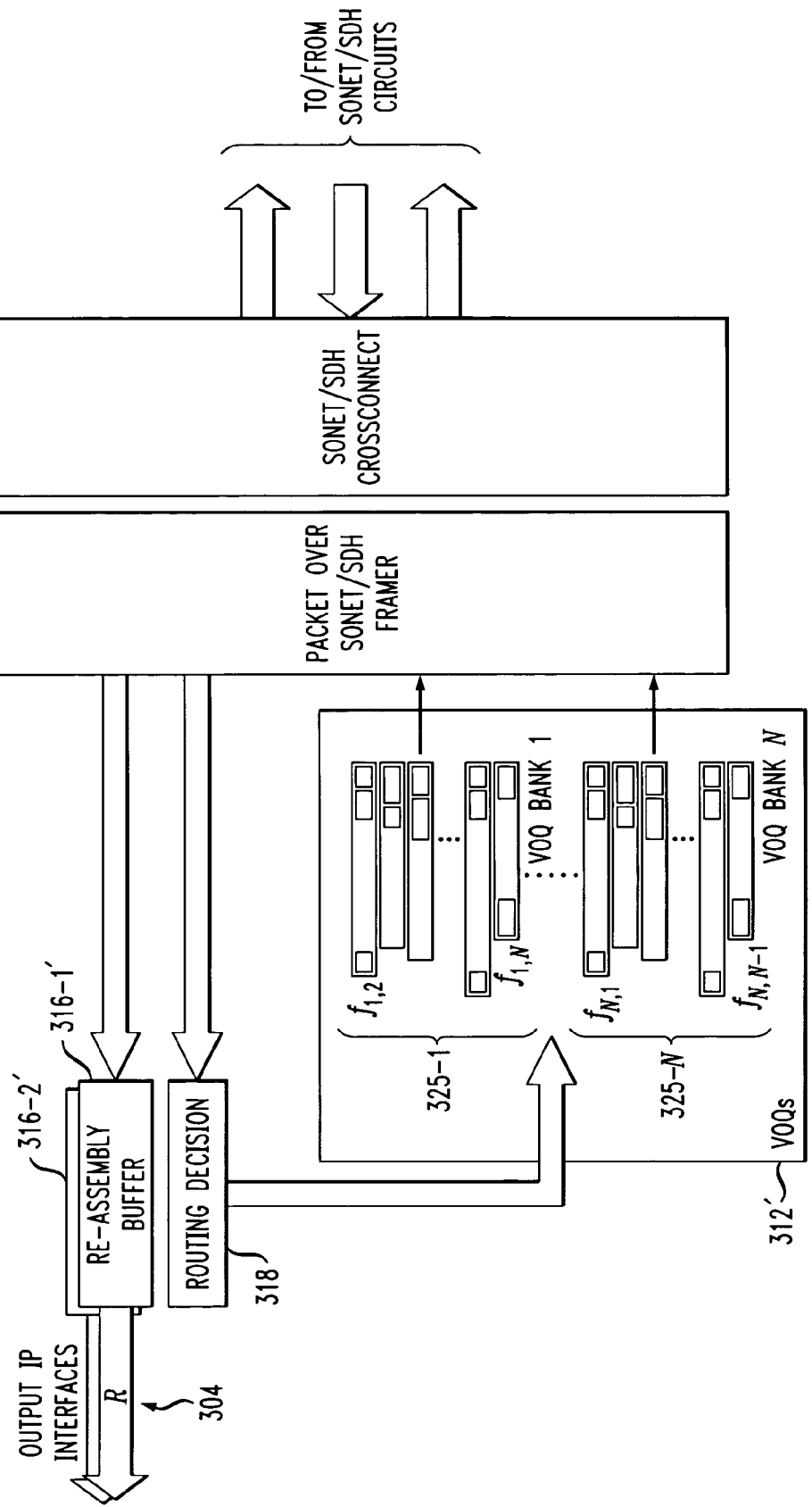
FIG. 4 shows a more detailed view of a portion of the network node of FIG. 3, illustrating multiple banks of virtual output queues configured in accordance with an illustrative embodiment of the invention.

FIG. 4 shows the logical partitioning of the VOQs for a given intermediate node. The portion of the node 300' includes output IP interfaces 304, SONET/SDH framer 306, SONET/SDH crossconnect 308, and routing decision block 318, configured as previously described. The node 300' also includes re-assembly buffers 316-1' and 316-2' which perform substantially the same function as the resequencing buffers 316 of FIG. 3. The VOQs 312' in node 300' are partitioned into N separate VOQs, each comprising a VOQ bank 325, denoted VOQ Bank 1 (325-1), ... VOQ Bank N (325-N). Each of the VOQ banks 325 comprises N−1 separate queues, with one such queue per source-destination flow $f_{i,k}$, where, as indicated previously, i≠k and i,k ∈ {1, ... N}. Thus, the VOQ bank 325-1 includes N−1 queues denoted $f_{1,2}, \ldots f_{1,N}$, and the VOQ bank 325-N includes N−1 queues denoted $f_{N,1}, \ldots f_{N,N-1}$. As noted above, these flow-based queues are utilized to equalize the path delays between the multiple paths used in a given load-balancing operation. In alternative embodiments, other types of techniques may be used to equalize the source-destination path delays at a given intermediate node.

A particular packet arriving at an intermediate node 300' is directed to the appropriate flow-based queue of the appropriate VOQ bank and is subsequently scheduled for departure on a SONET/SDH circuit between this node and the destination node. A given VOQ bank contains packets that are directed to the same destination node but may have arrived from different source nodes. Hence, it is possible that a packet that arrived later into the load-balanced network may reach the intermediate node ahead of a packet that arrived earlier into the load-balanced network, which can give rise to a problem known as head-of-line blocking. Flow-based partitioning of the VOQ bank in the manner shown in FIG. 4 eliminates this head-of-line blocking problem in its entirety.

As indicated previously, the illustrative embodiment utilizes an earliest-deadline-first scheduling algorithm to schedule packets for routing from the VOQs 312'. In constructing a SONET/SDH frame for a given destination node, each of the N−1 flows in the corresponding VOQ for the destination node is examined and packets from these flows are taken in the order of the earliest time stamp. This earliest-deadline-scheduling ensures that packets depart from the intermediate node in the order in which they arrived into the load-balanced network. It is to be appreciated that alternative scheduling algorithms can be used.

Advantageously, the combined mechanisms of path delay equalization and scheduling of packets by their earliest arrival time serves to limit or eliminate out-of-order packet arrival in a given load-balanced network architecture. In the illustrative embodiment, the need for packet reordering is limited at the cost of tolerating a fixed additional delay at the intermediate nodes to equalize the unequal path lengths between source and destination nodes.

Again, it should be emphasized that the above-described embodiments of the invention are intended to be illustrative only. For example, the particular steps of the load balancing process of FIG. 1, and the node and network configurations of FIGS. 2, 3 and 4, may be varied in alternative embodiments. Also, other types of virtual or non-virtual queuing arrangements may be used. Furthermore, the invention may be applied to any routing application, without regard to the type, arrangement or configuration of the network, network nodes, or communication protocols. These and numerous other alternative embodiments within the scope of the following claims will be readily apparent to those skilled in the art.

We claim:

1. A method of processing a traffic flow in a communication network comprising a plurality of nodes, the traffic flow being deliverable from a source node to at least one destination node via a plurality of intermediate nodes, the method comprising the steps of:
   splitting the traffic flow at the source node into a plurality of parts each comprising multiple packets; and
   distributing the parts to respective ones of the intermediate nodes that are designated as participating in a load balancing process for the traffic flow;
   substantially equalizing path delay differences for the parts by delay adjustment at one or more of the intermediate nodes that are designated as participating in the load balancing process; and
   scheduling packets of one or more of the parts for routing from respective ones of the intermediate nodes that are designated as participating in the load balancing process to the destination node based on arrival times of the packets at the source node.

2. The method of claim 1 wherein the parts of the traffic flow are distributed to the respective ones of the intermediate nodes over pre-provisioned circuits each configured to support a corresponding one of the parts.

3. The method of claim 1 wherein each of at least a subset of the parts follows one of N different paths from the source node to the destination node via a corresponding one of the intermediate nodes.

4. The method of claim 1 wherein the traffic flow is denoted $f_{i,k}$, where i is the source node of the flow and k is the destination node of the flow, and flow $f_{i,k}$ is load balanced substantially equally onto N intermediate nodes.

5. The method of claim 1 wherein timing is synchronized at the plurality of nodes and packets of the traffic flow are time stamped in accordance with their order of arrival at the source node.

6. The method of claim 1 wherein the packets of a given one of the parts are scheduled for routing from a corresponding one of the intermediate nodes to the destination node using an earliest-deadline-first scheduling algorithm.

7. The method of claim 1 wherein the path delay differences for the parts are substantially equalized by adjusting the delay of at least one of the parts at a corresponding one of the intermediate nodes.

8. The method of claim 1 wherein a given one of the intermediate nodes comprises a plurality of output queues, each associated with a corresponding one of N possible destination nodes in a load-balanced configuration of the network.

9. The method of claim 8 wherein a given one of the output queues comprises a queue bank logically partitioned into N−1 queues, one per source-destination flow $f_{i,k}$, where i≠k and i,k ∈ {1, ... N}.

10. The method of claim 9 wherein the given intermediate node comprises N(N−1) logically separate queues in its plurality of output queues.

11. The method of claim 1 wherein the step of substantially equalizing path delay differences for the parts further comprises the steps of:
   determining delays of N different paths used for respective parts of a traffic flow $f_{i,k}$ between a source node i and a destination node k;
   sorting the path delays in increasing order, the sorted path delays being pl to pN, where path delay pj stands for the path delay from source node i to destination node k passing through intermediate node j; and substantially equalizing the path delays of the N paths by adding a delay given approximately by (pN−pj) to path delay pj at the intermediate node j.

12. The method of claim 11 wherein an additional buffer delay equal to (pN−pj) is added to a particular queue that buffers packets of flow $f_{i,k}$ at the intermediate node j.

13. The method of claim 1 wherein at least one of the steps is implemented at least in part in software running on a processor of a node or other element of the network.

14. An apparatus for use in processing a traffic flow in a communication network comprising a plurality of nodes, the traffic flow being deliverable from a source node to at least one destination node via a plurality of intermediate nodes, the apparatus comprising:

a processing device comprising a processor coupled to a memory, the processing device being operative to split the traffic flow into a plurality of parts each comprising multiple packets, and to distribute the parts to respective ones of a plurality of intermediate nodes that are designated as participating in a load balancing process for the traffic flow;

wherein path delay differences for the parts are substantially equalized by delay adjustment at one or more of the intermediate nodes that are designated as participated in the load balancing process, and packets of one or more of the parts are scheduled for routing from respective ones of the intermediate nodes to the destination nodes that are designated as participated in the load balancing process to the destination node based on arrival times of the packets at the source node.

15. The apparatus of claim 14 wherein the processing device comprises an element of the source node.

16. The apparatus of claim 14 wherein the processing device is implemented as one or more integrated circuits.

17. An apparatus for use in processing a traffic flow in a communication network comprising a plurality of nodes, the traffic flow being deliverable from a source node to at least one destination node, the traffic flow being split into a plurality of parts each comprising multiple packets, the parts being distributed to respective ones of a plurality of intermediate nodes designated as participating in a load balancing process for the traffic flow, the apparatus comprising:

a processing device comprising a processor coupled to a memory, the processing device being operative to substantially equalize path delay differences for the parts by delay adjustment at one or more of the intermediate nodes that are designated as participating in the load balancing process, and to schedule packets of one or more of the parts for routing from respective ones of the intermediate nodes that are designated as participating in the load balancing process to the destination node based on arrival times of the packets at the source node.

18. The apparatus of claim 17 wherein the processing device comprises an element of one of the intermediate nodes.

19. The apparatus of claim 17 wherein the processing device is implemented as one or more integrated circuits.

* * * * *

UNITED STATES PATENT AND TRADEMARK OFFICE
CERTIFICATE OF CORRECTION

| | |
|---|---|
| PATENT NO. | : 7,515,543 B2 |
| APPLICATION NO. | : 11/018282 |
| DATED | : April 7, 2009 |
| INVENTOR(S) | : Harsha S. Nagesh et al. |

Page 1 of 1

It is certified that error appears in the above-identified patent and that said Letters Patent is hereby corrected as shown below:

In the claims:

Claim 14, col. 11, lines 26-27, please delete "participated" and insert --participating--.

Claim 14, col. 11, lines 29-30, please delete "to the destination nodes".

Claim 14, col. 11, line 30, please delete "participated" and insert --participating--.

Claim 17, col. 12, lines 19 and 22, please delete "that are".

Signed and Sealed this

Twenty-eighth Day of July, 2009

JOHN DOLL
*Acting Director of the United States Patent and Trademark Office*